United States Patent Office 2,770,646
Patented Nov. 13, 1956

2,770,646

QUATERNARY AMMONIUM COMPOUNDS OF BASIC ESTERS OF 2-ARYL-2-(1-HYDROXY-CYCLOHEXYL) ETHANOIC ACIDS

Gino R. Treves, New York, N. Y., assignor to Schieffelin & Co., New York, N. Y., a corporation of New York No Drawing. Application April 18, 1951,
Serial No. 221,752

15 Claims. (Cl. 260—473)

This invention relates to compounds having antispasmodic activity, and particularly to quaternary ammonium compounds of dialkyl amino alkyl esters of 2-aryl-2-(1-hydroxycyclohexyl)ethanoic acids. The aryl radical is chosen from the group consisting of phenyl and alkoxyphenyl, while the hydroxycyclohexyl radical may or may not be substituted by an alkyl group. Related compounds are described in copending application Serial No. 94,535, filed May 20, 1949, now Patent 2,558,020, issued June 26, 1951, of which the present application is a continuation-in-part.

One of the best known antispasmodic agents is atropine, the use of which, however, is limited because of the unwanted side reactions which characterize it. The present compounds possess advantageous antispasmodic properties, particularly anticholinergic activity, to a degree comparable to, or better than, that of atropine, and they possess anticholinergic activity exceeding most commercial preparations. For purposes of classification the compounds may be described as having an atropine-like action, that is, they have neurotropic activity.

The compounds may be represented generally by the formula:

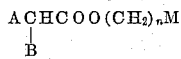

in which A is a group selected from the class consisting of hydroxycyclohexyl and alkyl-substituted hydroxycyclohexyl groups, $n$ is a whole number varying from 1 to 6, M is a quaternary ammonium salt moiety, and B is a radical selected from the class consisting of phenyl and alkoxyphenyl radicals, the alkyl and alkoxy groups each containing 1 to 6 carbon atoms. A more particular way of representing the compounds is:

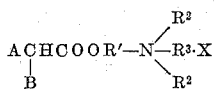

where A and B are the same as before, R' is a bivalent radical containing only carbon and hydrogen and having 1 to 6 carbon atoms and being derived from an aliphatic hydrocarbon by removal of a hydrogen atom from each of two terminal carbon atoms, $R^2$ is an alkyl group, $R^3$ is a univalent radical containing only carbon and hydrogen and being selected from the group consisting of alkyl, alkenyl, and aralkyl radicals, and X is an anionic moiety of an organic ester. Preferred compounds may be represented by the formula:

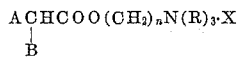

in which A, $n$, and B are the same as before, R is an alkyl group preferably containing 1 to 6 carbon atoms, and X is a halogen radical. A specific example of the compounds is the methobromide of beta-(diethylamino) ethyl ester of 2-phenyl-2-(1-hydroxycyclohexyl) ethanoic acid, which may be written structurally as follows:

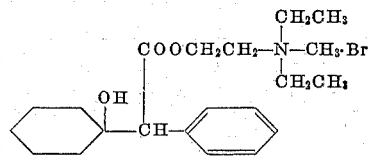

The compounds may be suitably prepared by reacting the free base (obtainable as described in the above-mentioned copending application) with an alkyl halide, aralkyl halide, or alkenyl halide. Preferably the halide containing agent is a bromide or an iodide; it may also be a chloride, although quaternary ammonium chloride compounds of the invention are preferably made by converting a quaternary ammonium bromide or iodide compound by means of a salt like silver chloride. Other agents for converting the free base to a quaternary ammonium salt are dialkyl sulfate, aryl sulfonic acid ester, etc. Specific examples of quaternary ammonium salts of the dialkyl amino alkyl esters of the above described substituted ethanoic acids are the methiodide, methobromide, methochloride, ethiodide, ethobromide, benzobromide (benzyl bromide), propeniodide (propenyl iodide), diethyl sulfate, etc.

The following examples may illustrate the preparation of the compounds:

Example 1

Approximately 5 cc. of a solution of sodium bicarbonate were shaken with 1 gram of the hydrochloride of beta - (dimethylamino)ethyl ester of 2-(4-methoxyphenyl) - 2 - (1 - hydroxycyclohexyl)ethanoic acid (prepared as described in said copending application) and with 10 cc. of anhydrous ether. The ether solution was separated and the bicarbonate solution extracted with more ether. The combined ether extracts were dried over anhydrous potassium carbonate and the ether driven off on the steam bath. The residue was dissolved in 5 cc. of absolute alcohol and an excess of methyl iodide (1 cc.) added and left at room temperature for a few hours. The excess methyl iodide and alcohol were driven off on the steam bath under reduced pressure. The residue was dissolved in a mixture of ethyl acetate and ethanol from which it crystallized. It was the methiodide of beta-(dimethylamino)ethyl ester of 2-(4-methoxyphenyl)-2-(1-hydroxycyclohexyl)ethanoic acid, melting at 165–166° C.

By using the method of Example 1, the following additional quaternary ammonium compounds were prepared, in each case the starting compound being the corresponding free base or the acid addition salt of such free base. The latter salt is readily converted to the free base by treatment with an alkali.

Example 2

Methiodide of beta-(dimethylamino)ethyl ester of 2-phenyl-2-(1-hydroxycyclohexyl)ethanoic acid, which was crystallized from ethyl acetate-ethanol mixture and melted at 158°–159° C.

Example 3

Methiodide of beta-(dimethylamino)ethyl ester of 2 - phenyl - 2 - (1-hydroxy-4-methylcyclohexyl)ethanoic acid, crystallized from acetone and melting at 92°–93° C.

Example 4

Methiodide of beta-(diethylamino)ethyl ester of 2-phenyl-2-(1-hydroxycyclohexyl)ethanoic acid, crystallized from ethanol-ether mixture and melting at 139–141° C.

Example 5

Methiodide of beta-(diethylamino)ethyl ester of 2-phenyl-2-(1 - hydroxy - 4 - methylcyclohexyl)ethanoic acid, crystallized from acetone and melting at 158–159° C.

Example 6

Methiodide of beta-(diethylamino)ethyl ester of 2-(4-methoxyphenyl)-2-(1-hydroxycyclohexyl)ethanoic acid, crystallized from absolute ethanol and melting at 179–180° C.

Example 7

Methiodide of beta-(diethylamino)ethyl ester of 2-(4-methoxyphenyl)-2-(1 - hydroxy - 4 - methylcyclohexyl)-ethanoic acid, crystallized from absolute ethanol and melting at 195–196° C.

Example 8

Ethiodide of beta-(dimethylamino)ethyl ester of 2-phenyl-2-(1-hydroxycyclohexyl)ethanoic acid, crystallized from absolute ethanol and melting at 143–146° C. To prepare this compound ethyl iodide was used in place of the methyl iodide of Example 1.

Example 9

Using methyl bromide instead of the methyl iodide of Example 1, the methobromide of beta-(diethylamino)-ethyl ester of 2-phenyl-2-(1-hydroxycyclohexyl)ethanoic acid was prepared. It was crystallized from a mixture of alcohol and ether and melted at 195–196° C.

Example 10

One gram of the compound of Example 4 was refluxed in 15 cc. of methanol for 1 hour with .33 gm. of silver chloride. The mixture was then cooled and filtered. The solvent was driven off and the residue crystallized from a mixture of ethanol and ether. It was the methochloride of beta-(diethylamino)ethyl ester of 2-phenyl-2-(1-hydroxycyclohexyl)ethanoic acid, melting at 179–182° C.

When tested according to the Magnus technique on isolated strips of rabbit ileum previously subjected to the action of acetylcholine to induce spasm, the above described compounds displayed a high degree of anticholinergic activity of the order of magnitude of atropine. The compound of Example 9 displayed anticholinergic activity greater than that of atropine.

In the light of the foregoing description, the following is claimed:

1. The compound:

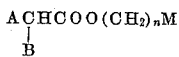

in which A is a group selected from the class consisting of 1-hydroxycyclohexyl and alkyl-substituted 1-hydroxycyclohexyl groups, $n$ is a whole number varying from 1 to 6, M is a quaternary ammonium salt moiety, and B is a radical selected from the class consisting of phenyl and alkoxyphenyl radicals, said alkyl and alkoxy groups each containing 1 to 6 carbon atoms.

2. The compound:

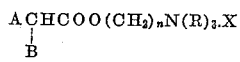

in which A is a member of the group consisting of 1-hydroxycyclohexyl and alkyl-substituted 1-hydroxycyclohexyl groups, $n$ is a whole number varying from 1 to 6, R is an alkyl group, X is a halogen radical selected from the group consisting of chlorine, bromine, and iodine, and B is a member of the group consisting of phenyl and alkoxyphenyl groups, said alkyl and alkoxy groups each containing 1 to 6 carbon atoms.

3. The compound of claim 2 in which A is a 1-hydroxycyclohexyl group and B is a phenyl group.

4. The compound of claim 2 in which A is a 1-hydroxycyclohexyl group and B is an alkoxyphenyl group.

5. The compound of claim 2 in which A is an alkyl-substituted 1-hydroxycyclohexyl group and B is a phenyl group.

6. The compound of claim 2 in which A is an alkyl-substituted 1-hydroxycyclohexyl group and B is an alkoxyphenyl group.

7. The quaternary ammonium compound:

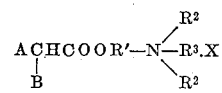

in which A is a group selected from the class consisting of 1-hydroxycyclohexyl and alkyl-substituted 1-hydroxycyclohexyl groups, R′ is a bivalent radical containing only carbon and hydrogen and having 1 to 6 carbon atoms and being derived from an aliphatic hydrocarbon by removal of a hydrogen atom from each of two terminal carbon atoms, $R^2$ is an alkyl group, $R^3$ is a univalent radical containing only carbon and hydrogen and being selected from the group consisting of alkyl, alkenyl, and aralkyl radicals, X is an anionic moiety selected from the group consisting of a halogen radical, $ArSO_3^-$, and $RSO_4^-$ where Ar is aryl and R is alkyl, said halogen radical being a member of the group consisting of $Cl^-$, $Br^-$, and $I^-$, and B is a radical selected from the class consisting of phenyl and alkoxyphenyl radicals, said alkyl and alkoxy groups each containing 1 to 6 carbon atoms.

8. A compound according to claim 7 in which $R^3$ is an alkyl radical having 1 to 6 carbon atoms.

9. A compound according to claim 7 in which $R^3$ is an alkyl radical having 1 to 6 carbon atoms and X is a halogen radical selected from the group consisting of $Cl^-$, $Br^-$, and $I^-$.

10. A compound according to claim 7 in which $R^3$ is an aralkyl radical.

11. A compound according to claim 7 in which $R^3$ is an alkenyl radical.

12. The methobromide of beta-(diethylamino)ethyl ester of 2-phenyl-2-(1-hydroxycyclohexyl)ethanoic acid.

13. The methoiodide of beta-(diethylamino)ethyl ester of 2-phenyl-2-(1-hydroxycyclohexyl)ethanoic acid.

14. The methochloride of beta-(diethylamino)ethyl ester of 2-phenyl-2-(1-hydroxycyclohexyl)ethanoic acid.

15. The methohalide of beta-(diethylamino) ethyl ester of 2-phenyl-2-(1-hydroxycyclohexyl) ethanoic acid, said halide moiety being a member of the group consisting of chloride, bromide, and iodide.

References Cited in the file of this patent

UNITED STATES PATENTS

| | | |
|---|---|---|
| 2,375,138 | Salvin et al. | May 1, 1945 |
| 2,399,736 | Holmes et al. | May 7, 1946 |
| 2,428,978 | Martin et al. | Oct. 14, 1947 |
| 2,558,020 | Treves | June 26, 1951 |
| 2,589,224 | Burtner | Mar. 18, 1952 |

OTHER REFERENCES

Berger: "Medicinal Chemistry," 1951, p. 434.